(12) United States Patent
Zia

(10) Patent No.: US 9,067,487 B2
(45) Date of Patent: Jun. 30, 2015

(54) COLLAPSIBLE FUEL DOOR HOUSING FOR A VEHICLE

(75) Inventor: Asif Zia, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 305 days.

(21) Appl. No.: 13/599,608

(22) Filed: Aug. 30, 2012

(65) Prior Publication Data

US 2014/0059932 A1    Mar. 6, 2014

(51) Int. Cl.
*B60K 15/05* (2006.01)
*B60K 15/04* (2006.01)
*E05B 83/34* (2014.01)
*E05B 81/04* (2014.01)
*E05B 79/20* (2014.01)

(52) U.S. Cl.
CPC ......... *B60K 15/04* (2013.01); *B60K 2015/0561* (2013.01); *B60K 2015/0569* (2013.01); *B60K 2015/0584* (2013.01); *B60K 15/05* (2013.01); *E05B 83/34* (2013.01); *B60K 2015/053* (2013.01); *B60K 2015/047* (2013.01); *B60K 2015/0553* (2013.01); *E05B 81/04* (2013.01); *E05B 79/20* (2013.01)

(58) Field of Classification Search
CPC ........... B60K 15/05; B60K 2015/0487; B60K 2015/0553
USPC ...................................................... 296/97.22
See application file for complete search history.

(56) References Cited

U.S. PATENT DOCUMENTS

| | | | |
|---|---|---|---|
| 4,782,978 A * | 11/1988 | Appleby et al. ............ | 296/97.22 |
| 4,809,863 A | 3/1989 | Woodcock et al. | |
| 5,054,520 A | 10/1991 | Sherwood et al. | |
| 5,056,570 A | 10/1991 | Harris et al. | |
| 5,118,155 A * | 6/1992 | Koop ............................ | 296/1.06 |
| 5,320,147 A | 6/1994 | Jamrog | |
| 5,836,638 A * | 11/1998 | Slocum ....................... | 296/97.22 |
| 5,906,406 A * | 5/1999 | Pajakowski ................ | 296/97.22 |
| 6,033,006 A * | 3/2000 | Bovellan et al. ........... | 296/97.22 |
| 6,189,959 B1 | 2/2001 | VanAssche et al. | |
| 6,336,482 B1 | 1/2002 | Cunkle et al. | |
| 6,805,159 B2 | 10/2004 | Beaulne et al. | |
| 7,128,232 B2 * | 10/2006 | Beck ............................ | 220/86.2 |

(Continued)

FOREIGN PATENT DOCUMENTS

DE    10026841 A1    12/2001
DE    202004005554 U1    7/2004

(Continued)

OTHER PUBLICATIONS

International Seach Report and Written Opinion dated May 30, 2014 for International Application No. PCT/US2013/049546, International Filing Date Jul. 8, 2013.

*Primary Examiner* — Glenn Dayoan
*Assistant Examiner* — Paul Chenevert
(74) *Attorney, Agent, or Firm* — Ralph E Smith

(57) ABSTRACT

A collapsible fuel-door housing is provided and may include a first housing and a second housing slidably attached to the first housing and moveable from a first state overlapping the first housing to a second state adjacent to the first housing. The fuel-door housing may also include a locking mechanism moveable between an unlocked state permitting movement of the second housing into the second state and a locked state restricting relative movement between the first housing and the second housing to maintain the second housing in the second state.

20 Claims, 9 Drawing Sheets

(56) References Cited

U.S. PATENT DOCUMENTS

| | | |
|---|---|---|
| 7,293,586 B2 | 11/2007 | Groom et al. |
| 7,302,977 B2 | 12/2007 | King et al. |
| 7,549,694 B2 | 6/2009 | Scott et al. |
| 7,568,494 B2 | 8/2009 | Devall |
| 7,665,493 B2 | 2/2010 | Groom et al. |
| 7,967,042 B2 | 6/2011 | Groom et al. |
| 7,967,361 B2 | 6/2011 | Scott et al. |
| 8,371,345 B2 * | 2/2013 | Sato et al. ............... 141/350 |
| 2004/0021315 A1 * | 2/2004 | Miura et al. ............. 285/192 |
| 2006/0231138 A1 | 10/2006 | Devall |
| 2006/0289084 A1 | 12/2006 | Groom et al. |
| 2007/0034287 A1 | 2/2007 | Groom et al. |
| 2007/0056654 A1 * | 3/2007 | Poley et al. ............... 141/369 |
| 2008/0136210 A1 | 6/2008 | Scott et al. |
| 2009/0217503 A1 | 9/2009 | Scott et al. |
| 2010/0019535 A1 | 1/2010 | Chang et al. |
| 2010/0078932 A1 | 4/2010 | Gurtatowski |
| 2010/0175785 A1 | 7/2010 | Groom et al. |

FOREIGN PATENT DOCUMENTS

| | | | |
|---|---|---|---|
| DE | 10360096 A1 | 7/2005 | |
| EP | 1657097 A1 * | 5/2006 | ............ B60K 15/04 |
| EP | 1690727 A2 | 8/2006 | |
| JP | 57151430 A * | 9/1982 | ............ B60K 15/04 |
| WO | 2011025606 A1 | 3/2011 | |

* cited by examiner

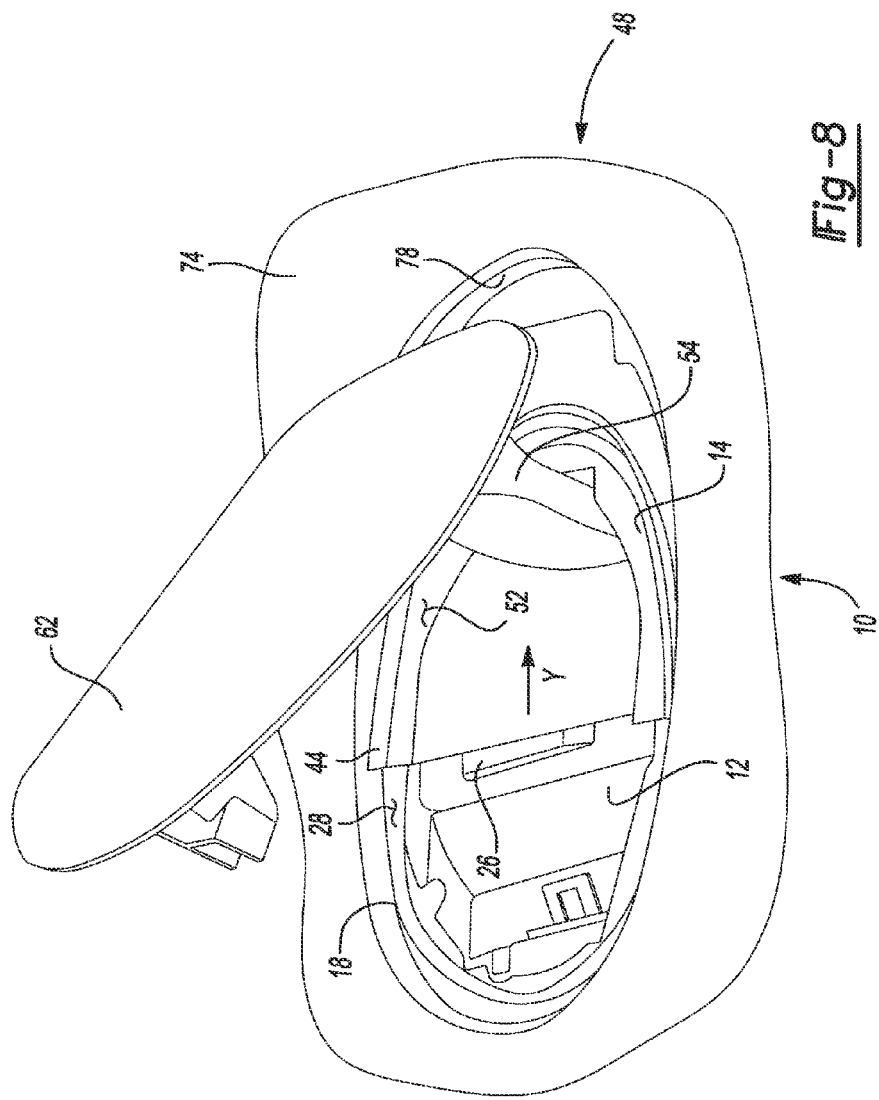

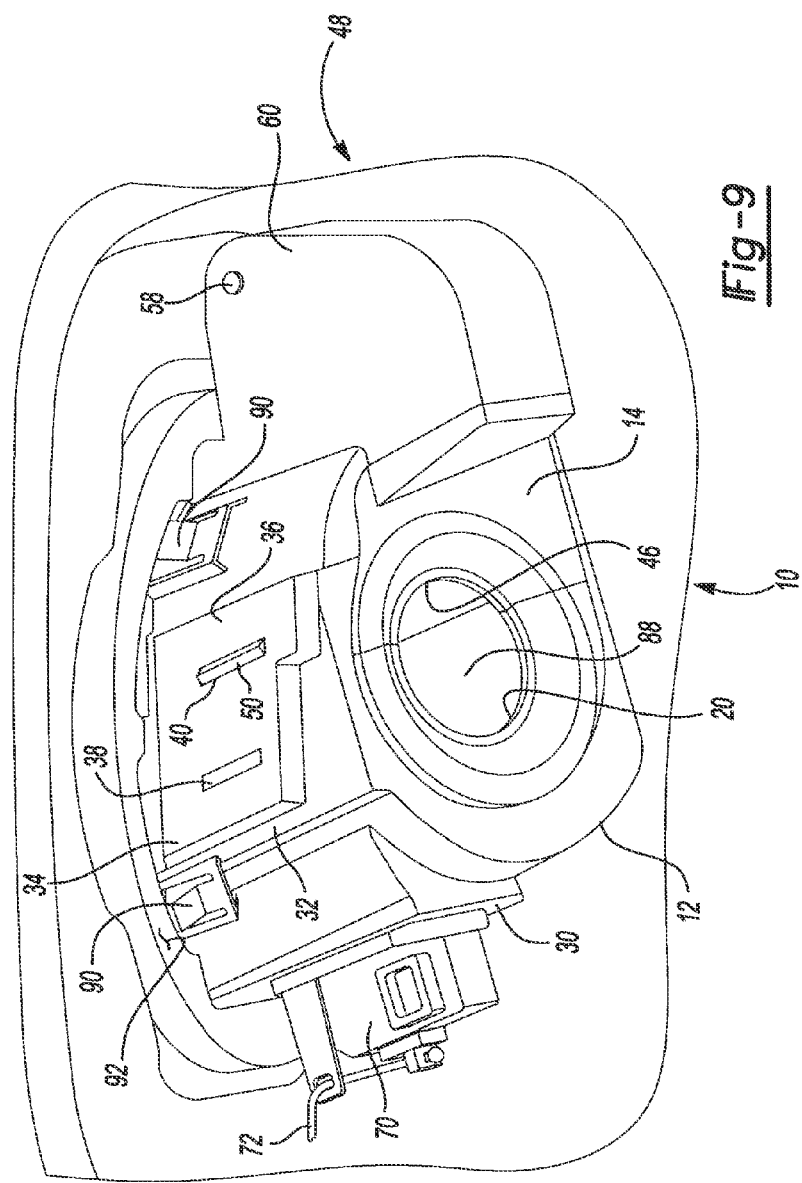

COLLAPSIBLE FUEL DOOR HOUSING FOR A VEHICLE

FIELD

The present disclosure relates to a fuel-door housing for a vehicle and more particularly to a collapsible fuel-door housing that facilitates installation of the fuel-door housing into a vehicle.

BACKGROUND

Vehicle manufacturing is a difficult process that requires coordination of both manufacturing personnel and the physical components of a vehicle within an assembly plant to ensure the vehicle is properly assembled within a given timeframe. Generally speaking, the more components that must be installed in a vehicle at an assembly plant, the longer it takes to assemble the vehicle, which, in turn, reduces the capacity and efficiency of the plant. Further, the increase in the overall number of components likewise increases the number of manufacturing operations and, often, the number of personnel required to assemble the vehicle. As a result, the cost associated with operating the assembly plant and producing the vehicle is increased.

Vehicle manufacturers strive to reduce the number of components of a vehicle to the extent possible to reduce the cost associated with manufacturing the vehicle and, further, to simplify the manufacturing process. However, when a reduction in components is not possible or economically feasible, vehicle manufacturers often source subassemblies from automotive component suppliers that require little or no assembly time in the vehicle manufacturer's assembly plant. For example, vehicle manufacturers routinely source fuel-door housings that arrive at their assembly plant complete with a fuel door assembled to the housing. The fuel-door housings and accompanying fuel doors are typically sequenced with the production schedule of the vehicle manufacturer such that each fuel-door housing is ready to be installed in an outer panel of a specific vehicle without requiring additional assembly steps by the vehicle manufacturer.

While conventional fuel-door assemblies may be properly sequenced with a production schedule of a vehicle manufacturer and provide the vehicle manufacturer with a ready-to-install subassembly, conventional fuel-door assemblies cannot be sourced to the vehicle manufacturer's assembly plant with other components connected to the housing. For example, conventional fuel-door housings cannot be sourced to a vehicle manufacturer's assembly plant with a remote-actuator assembly and associated release cable preassembled to the fuel-door housing, as such components prevent installation of the fuel-door housing into the outer panel of the vehicle. As a result, the actuator assembly and release cable must be sourced to the vehicle manufacturer's assembly plant as separate components and must be installed after installation of the fuel-door hosing into the outer panel. Requiring the actuator assembly and release cable to be separately sourced to the assembly plant therefore increases the overall complexity and time required to produce a vehicle which, in turn, increases the overall cost associated with producing the vehicle.

SUMMARY

A collapsible fuel-door housing is provided and may include a first housing and a second housing slidably attached to the first housing and moveable from a first state overlapping the first housing to a second state adjacent to the first housing. The fuel-door housing may also include a locking mechanism moveable between an unlocked state permitting movement of the second housing into the second state and a locked state restricting relative movement between the first housing and the second housing to maintain the second housing in the second state.

In another configuration, a collapsible fuel-door housing is provided and may include a first housing and a second housing slidably attached to the second housing. The fuel-door assembly may also include a locking mechanism that permits relative movement between the first housing and the second housing in an unlocked state. The locking mechanism may also restrict relative movement between the first housing and the second housing when at least one of the first housing and the second housing is moved away from the other of the first housing and the second housing a predetermined distance to fix a relative position between the first housing and the second housing.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 8 is a perspective view of the fuel-door housing of FIG. 2 disposed within an aperture of a body panel of a vehicle and moving from an overlapped state to an expanded state; and FIG. 9 is a perspective view of the fuel-door housing of FIG. 2 shown in an expanded state and installed in a body panel of a vehicle.

DETAILED DESCRIPTION

Figure 2:
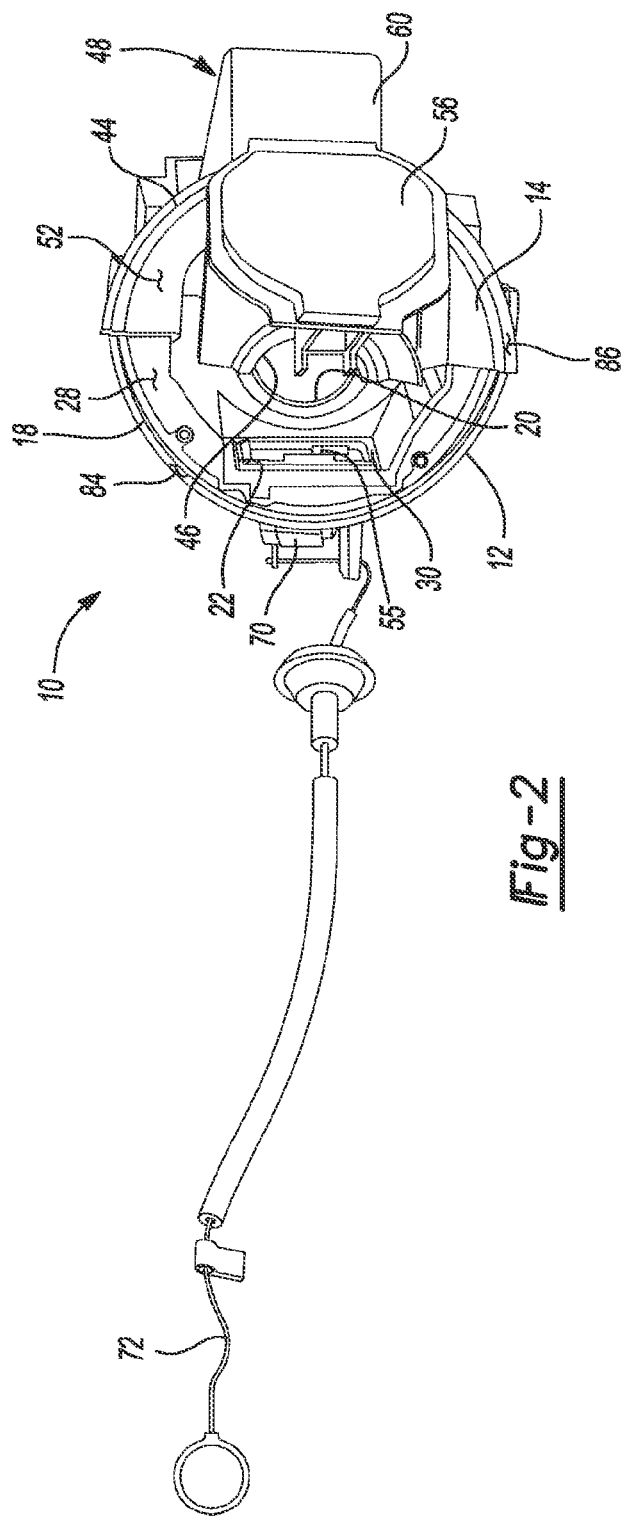
FIG. 2 is a top perspective view of a fuel-door housing in accordance with the principles of the present disclosure shown in an overlapped state.
Figure 3:
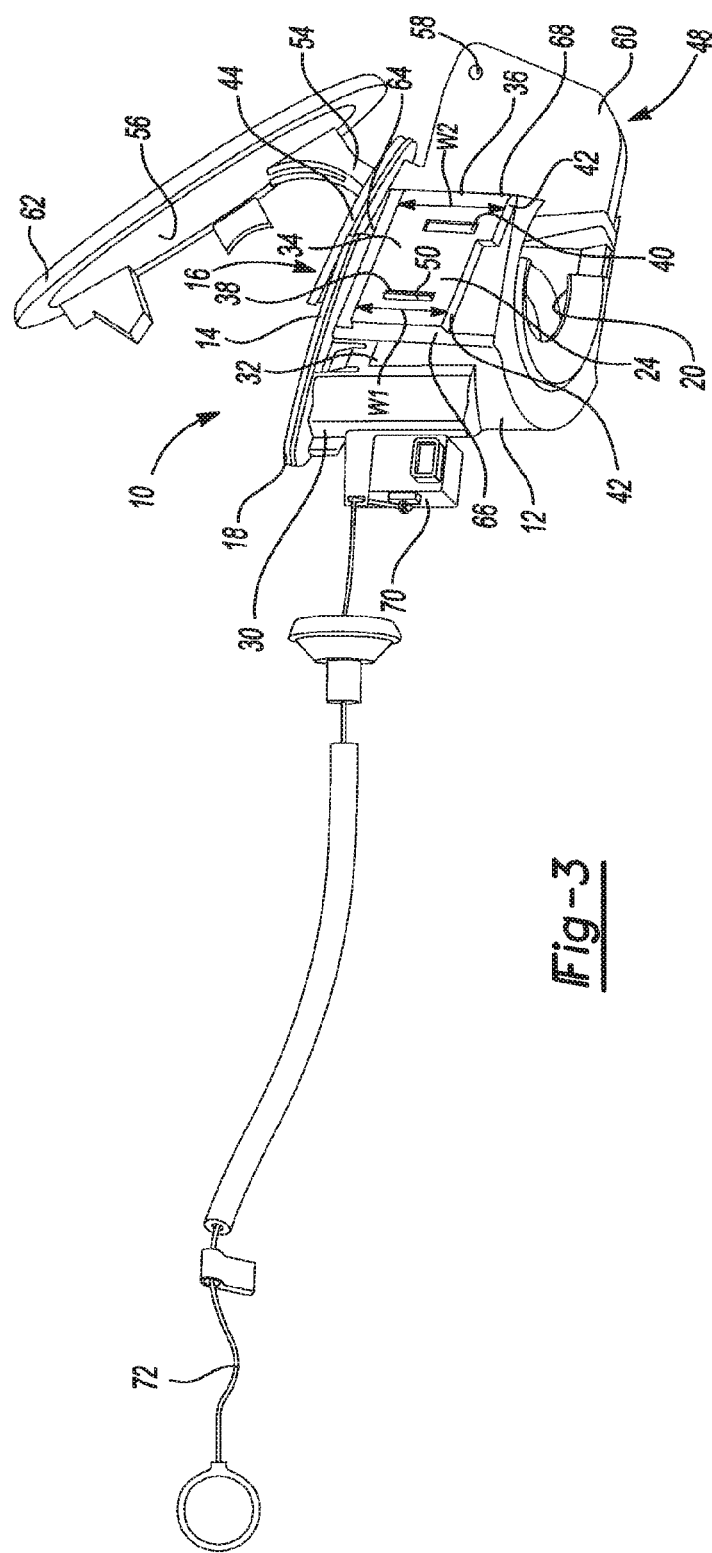
FIG. 3 is a perspective view of the fuel-door housing of FIG. 2 shown in the overlapped state.
Figure 4:
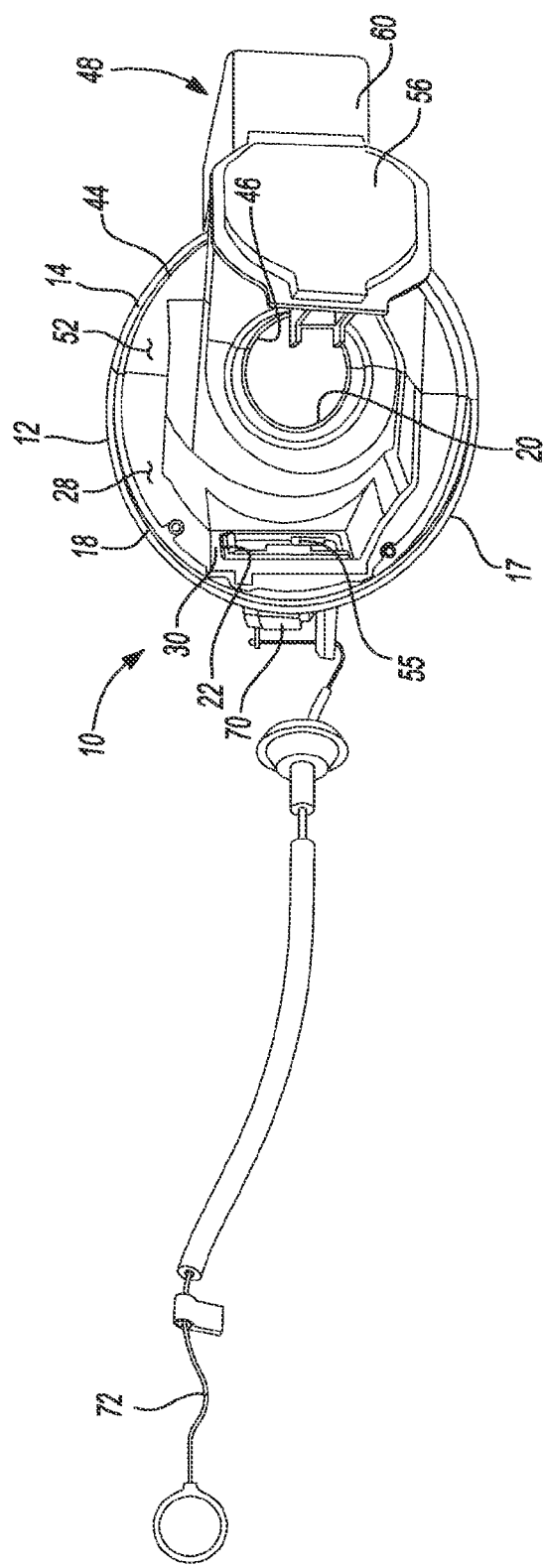
FIG. 4 is a top perspective view of the fuel-door housing of FIG. 2 shown in an expanded state.
Figure 5:
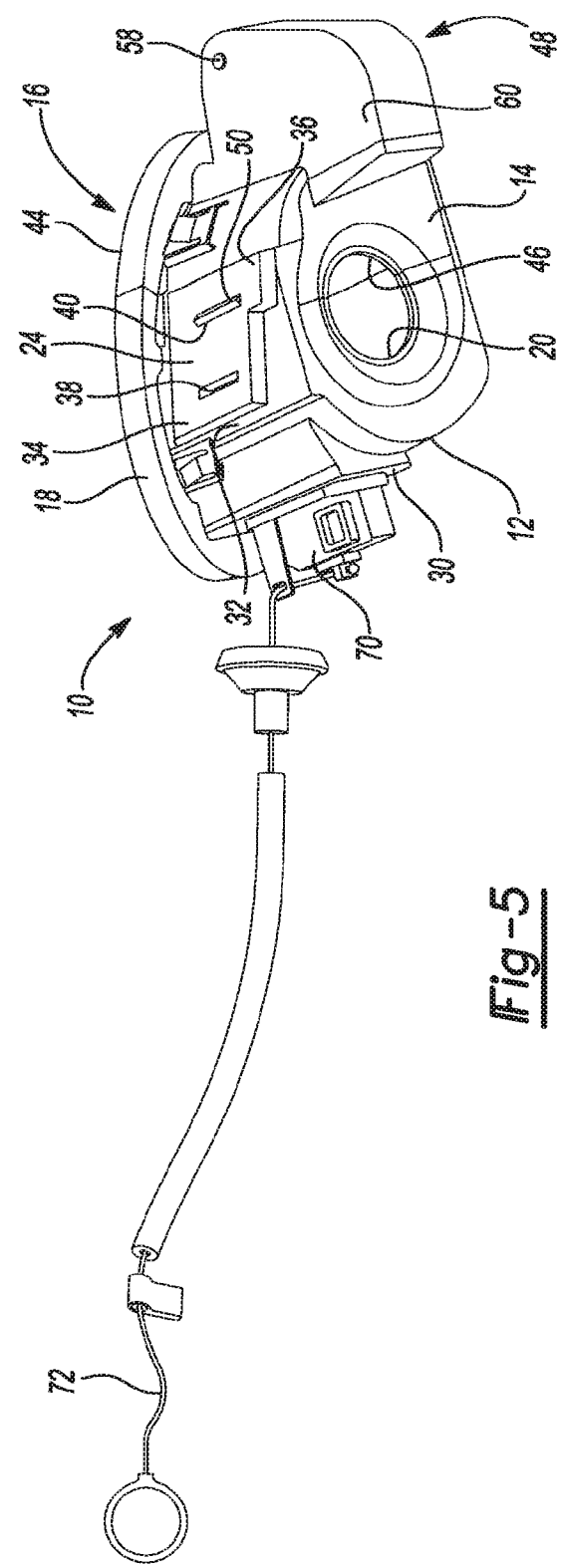
FIG. 5 is a perspective view of the fuel-door housing of FIG. 3 shown in an expanded state.

With reference to the figures, a fuel-door housing 10 is provided and may include a first housing 12, a second housing 14, and a locking mechanism 16 (FIG. 3). The first housing 12 and the second housing 14 cooperate to define an outer perimeter 17 of the fuel-door housing 10 and may be slidably attached to one another to allow the first housing 12 and the second housing 14 to be moved from an overlapped state (FIGS. 2 and 3) to an expanded state (FIGS. 4 and 5) that expands the outer perimeter 17 of the fuel-door housing 10. As can be seen from FIGS. 2-5, when the first and second housings 12, 14 have been moved away from each other from the overlapped state to the expanded state, the outer perimeter 17 of the fuel-door housing 10 is expanded compared to when the first and second housings 12, 14 are in the overlapped state. The locking mechanism 16 may be supported by the first housing 12 and the second housing 14 to maintain the first housing 12 and the second housing 14 in the overlapped state until a force is applied to one or both of the first housing 12 and the second housing 14 to move the first housing 12 and the second housing 14 away from one another and into the expanded state. The locking mechanism 16 may then be moved into a locked state to maintain the first housing 12 and the second housing 14 in the expanded state.

The first housing 12 may include a rim 18, a recess 20, a mounting aperture 22, a first track or guide 24, and a second track or guide 26 (FIG. 8). The rim 18 may extend from a top surface 28 of the first housing 12 and may include a substantially semi-circular or semi-oval shape. The recess 20 may be disposed on an opposite end of the first housing 12 from the rim 18 and may likewise include a semi-circular or semi-oval shape.

The mounting aperture 22 may be formed through a wall 30 of the first housing 12 such that the mounting aperture 22 is disposed between the rim 18 and the recess 20. The first guide 24 and the second guide 26 may be formed on opposite sides of the first housing 12 from one another and may likewise be disposed between the rim 18 and the recess 20. The first track 24 and the second track 26 may be substantially identical to one another. Accordingly, the following description is made with respect to the first track 24 while a detailed description of the second track 26 is foregone.

The first track 24 may extend from a sidewall 32 of the first housing 12 and may include a first portion 34 and a second portion 36. As shown in FIG. 3, the first portion 34 may include a width (W1) that is less than a width (W2) of the second portion 36. In addition, the first portion 34 may include a first locking aperture 38 while the second portion 36 includes a second locking aperture 40. The second locking aperture 40 may be offset from the first locking aperture 38 due to the larger width (W2) of the second portion 36. Namely, the first locking aperture 38 and the second locking aperture 40 may be positioned relative to a bottom edge 42 of the first track 24 such that the first locking aperture 38 and the second locking aperture 40 are spaced apart from the bottom edge 42 to the same extent.

The first track 24 may be formed at an angle such that the bottom edge 42 is sloped toward a bottom portion of the first housing 12 proximate to the recess 20. Positioning the first track 24 at an angle such that the bottom edge 42 slopes toward the bottom portion of the first housing 12 allows the second housing 14 to move from the overlapped state to the expanded state, as will be described in greater detail below.

The second housing 14 may include a rim 44, a recess 46, a hinge assembly 48, and a pair of locking projections 50. The rim 44 may include a semi-circular or semi-oval shape and may extend from a top surface 52 of the second housing 14. The recess 46 may be disposed at an opposite end of the second housing 14 from the rim 44 and may likewise include a semi-circular or semi-oval shape.

Figure 1:
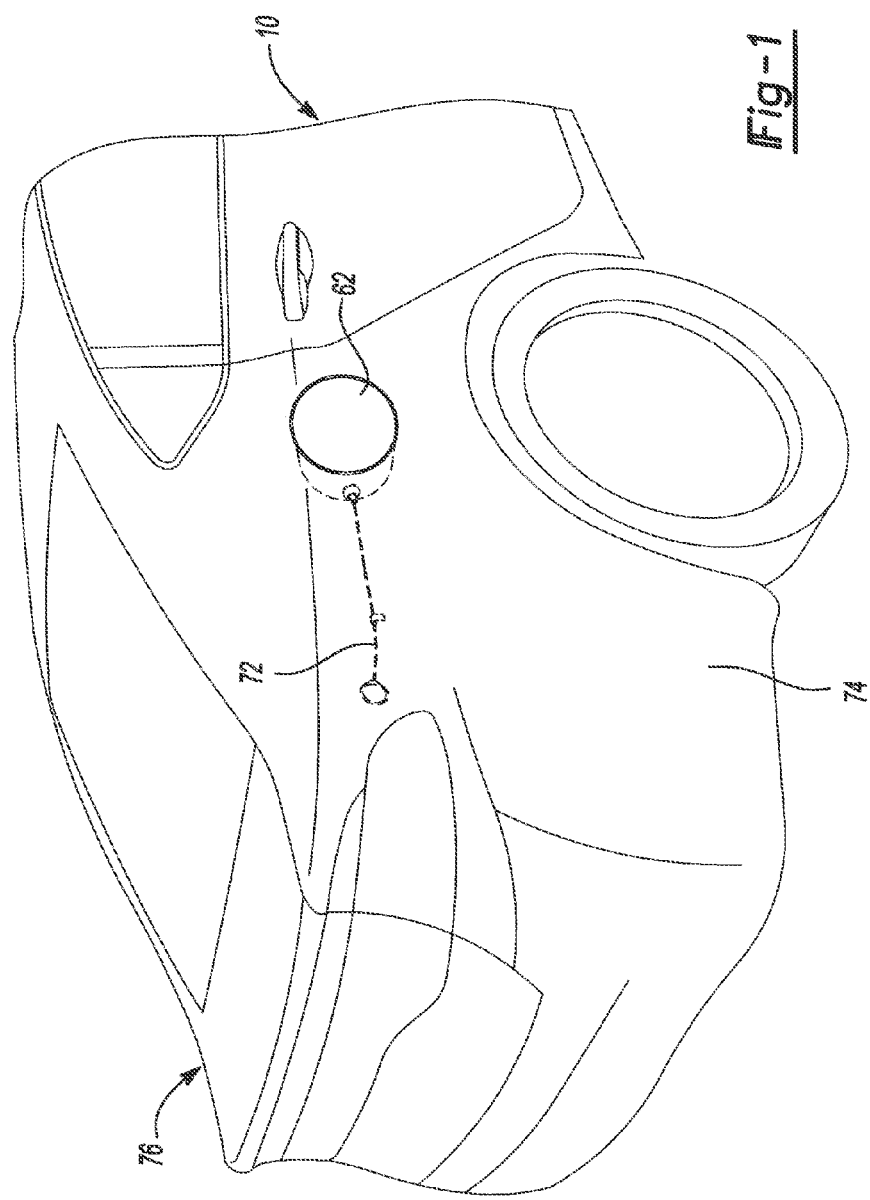
FIG. 1 is a partial perspective view of a vehicle incorporating a fuel-door housing in accordance with the principles of the present disclosure.

The hinge assembly 48 may include an arm 54, a support 56, and a pivot 58. The arm 54 may be pivotably supported by the pivot 58 within a hinge housing 60 and may be fixed for movement with the support 56. Specifically, the arm 54 may be pivotably connected to the hinge housing 60 at the pivot 58 at a first end of the arm 54 and may be attached to the support 56 at a second end of the arm 54 opposite the first end. The support 56 may receive a door 62 (FIGS. 1 and 3) that is fixed for movement with the support 56 and, thus, moves with the arm 54 as the arm 54 is pivoted about the pivot 58.

The second housing 14 may include a pair of locking projections 50 that respectively extend from opposite sides of the second housing 14 and are respectively and slidably received within the first track 24 and the second track 26 of the first housing 12. Because the locking projections 50 are virtually identical, only the locking projection 50 associated with the first track 24 of the first housing 12 will be described and shown. A detailed description of the locking projection 50 associated with the second track 26 is foregone.

The locking projection 50 may extend from a sidewall 64 (FIG. 3) of the second housing 14 and may include a tapered surface (not shown) that facilitates insertion of the locking projection 50 into the first locking aperture 38 and the second locking aperture 40. The locking projection 50 may be received within the first track 24 and may be disposed proximate to a first end 66 of the first track 24 when the first housing 12 and the second housing 14 are in the overlapped state. Conversely, the locking projection 50 may be disposed proximate to a second end 68 of the first track 24 when the first housing 12 and the second housing 14 are in the expanded state. Accordingly, when the first housing 12 and the second housing 14 are in the overlapped state, the locking projection 50 may be received within the first locking aperture 38 while the locking projection 50 may be received within the second locking aperture 40 when the first housing 12 and the second housing 14 are in the expanded state.

Engagement between the locking projection 50 and the first locking aperture 38 serves to maintain the first housing 12 and the second housing 14 in the overlapped state until a force is applied to one or both of the first housing 12 and the second housing 14 to move the first housing 12 and the second housing 14 away from one another. When a force is applied to one or both of the first housing 12 and the second housing 14 to move the first housing 12 and the second housing 14 away from one another such that the first housing 12 and the second housing 14 are moved into the expanded state, the locking projection 50 may be moved into the second locking aperture 40 to maintain the first housing 12 and the second housing 14 in the expanded state. As such, interaction between the locking projection 50, the first track 24, and the first and second locking apertures 38, 40, constitute the locking mechanism 16 that selectively maintains the first housing 12 and the second housing 14 in the overlapped state or the expanded state, as will be described in greater detail below.

The fuel-door housing 10 may additionally include an actuation mechanism 70 that is attached to the first housing 12 at the mounting aperture 22. The actuation mechanism 70 may be electrically connected to a wiring harness (not shown) that provides for remote actuation of a locking mechanism 55 associate with the arm 54 to permit movement of the arm 54 and, thus, the support 56 and door 52 from a locked state (FIG. 1) to an unlocked state (FIG. 3) to gain access to an interior of the first housing 12 and the second housing 14.

The actuation mechanism 70 may be coupled to a release cable 72 that allows the locking mechanism 55 to be manually moved from the locked state to the unlocked state. Movement of the locking mechanism 55 from the locked state to the unlocked state permits movement of the arm 54 and, thus, the support 56 and the door 62, from the position shown in FIG. 1 to a position located generally away from the rim 18 of the first housing 12 and away from the rim 44 of the second housing 14 (FIG. 3).

With particular reference to FIGS. 1 and 6-9, installation of the fuel-door housing 10 into a body panel 74 of a vehicle 76 (FIG. 1) will be described in detail. The fuel-door housing 10 is initially positioned relative to an aperture 78 of the body panel 74 with the first housing 12 and the second housing 14 in the overlapped state. Namely, the rim 44 of the second housing 14 may be in an overlapped relationship with the rim 18 of the first housing 12 such that a portion of the rim 44 is positioned above the rim 18. In this position, the locking projections 50 may be disposed within respective ones of the first locking apertures 38 and, as a result, may be disposed proximate to the first end 66 of the first track 24 and the second track 26. Positioning the locking projections 50 within respective ones of the first locking apertures 38 restricts relative movement between the first housing 12 and the second housing 14 and maintains the first housing 12 and the second housing 14 in the overlapped state.

Figure 6:
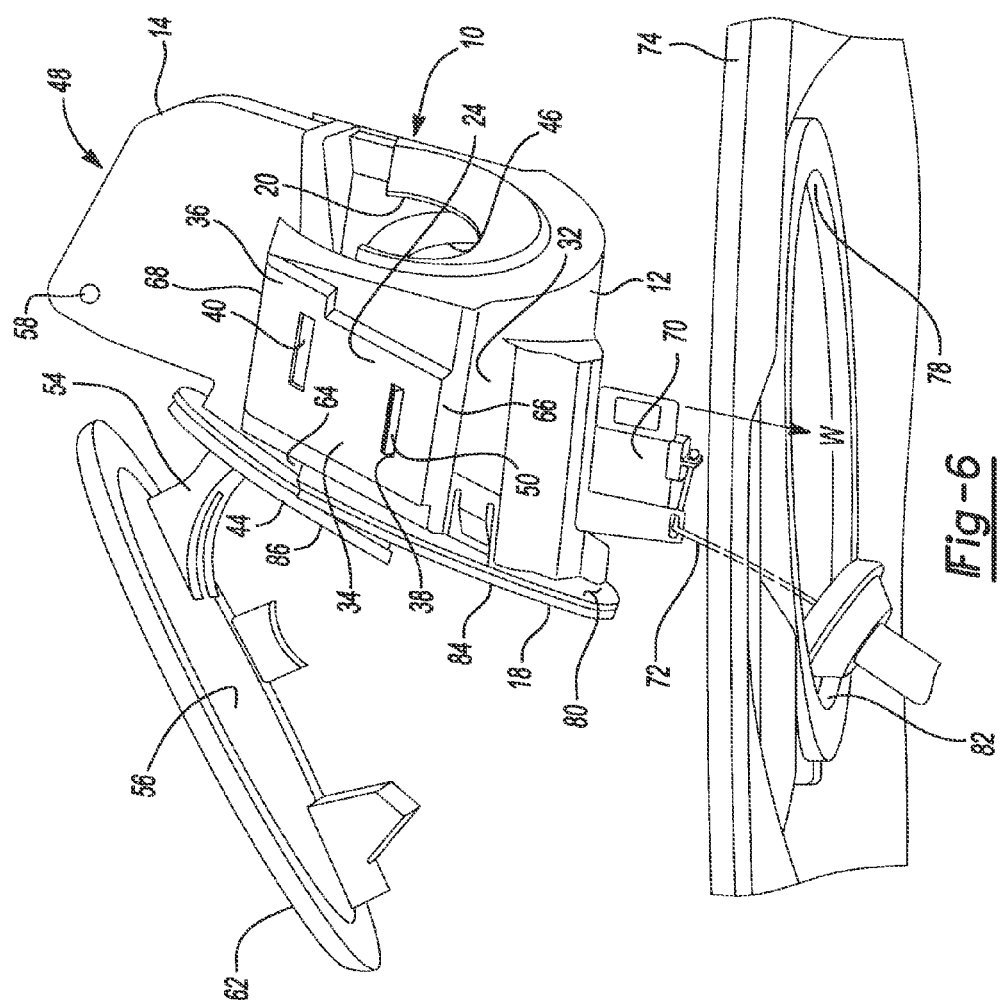
FIG. 6 is a perspective view of the fuel-door housing of FIG. 2 being installed in a body panel of a vehicle.

The fuel door housing 10 may be positioned relative to the aperture 78 of the body panel 74 such that the release cable 72 and actuation mechanism 70 are initially inserted into the aperture 78 (FIG. 6). Namely, the release cable 72 and the actuation mechanism 70 may be moved in the (W) direction and, as a result, the first housing 12 and the second housing 14 may likewise be moved in the (W) direction.

Figure 7:
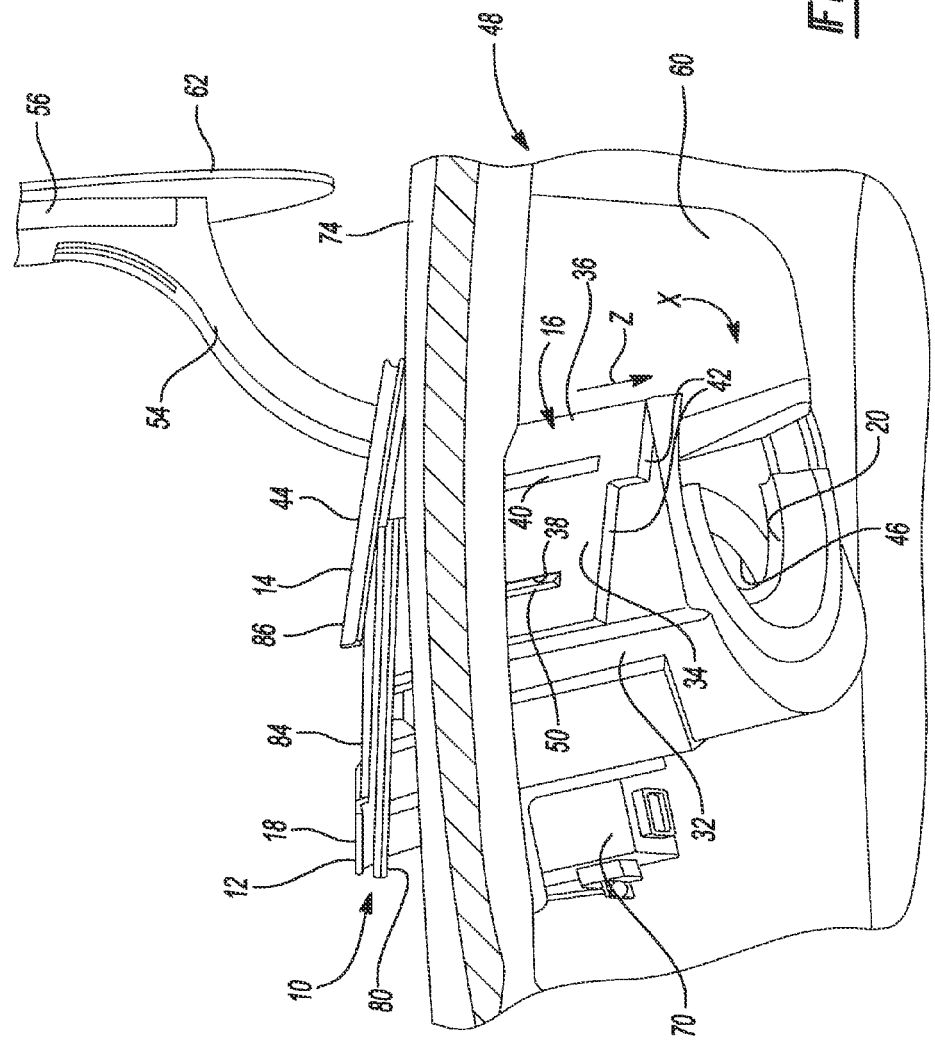
FIG. 7 is a side view of the fuel-door housing of FIG. 2 shown in an overlapped state and disposed within an aperture of a body panel of a vehicle.

The fuel-door housing 10 may be moved in the (W) direction until the hinge housing 60 passes through the body panel 74. At this point, the rim 18 of the first housing 12 may be positioned above a portion of the body panel 74 adjacent to the aperture 78 such that a bottom surface 80 of the rim opposes the body panel 74 in an area proximate to the aperture 78 (FIG. 7). Once the bottom surface 80 of the rim 18 is in contact with the body panel 74 proximate to the aperture 78, a rotational force in the (X) direction (FIG. 7) may be applied to the fuel door housing 10 to properly position the first housing 12 relative to the aperture 78. Specifically, the rotational force applied to the fuel-door housing 10 in the (X) direction causes the first housing 12 to abut an edge 82 (FIG. 6) of the aperture 78 to properly position the first housing 12 relative to the aperture 78. Once the first housing 12 is properly positioned relative to the aperture 78, a force may be applied to the second housing 14 to move the second housing 14 from the overlapped state to the expanded state.

The force applied to the housing may be applied in the (Y) direction (FIG. 8) to cause the second housing 14 to move relative to the first housing 12. The locking projections 50 may disengage the first locking apertures 38, as the second housing 14 is moved relative to the first housing 12. Further, movement of the second housing 14 relative to the first housing 12 may be guided by the shape of the first track 24 and the second track 26 and the respective bottom edges 42 of the first track 24 and the second track 26. Namely, because the first track 24 and the second track 26 include a bottom edge 42 that slopes toward the respective recesses 20, 46 of the first housing 12 and the second housing 14, when the force applied to the second housing 14 is applied in the (Y) direction, the shape of the tracks 24, 26 and interaction between the locking projections 50 and the respective tracks 24, 26 causes the second housing 14 to move away from the first housing 12 and in the (Z) direction (FIG. 7). Movement of the second housing 14 in the (Z) direction may be accomplished due to the increased width (W2) of the second portion 36 of the first track 24 and the second track 26, which provides clearance to allow the second housing 14 to move in the (Z) direction.

Once the second housing 14 is sufficiently moved in the (Y) direction and in the (Z) direction, the locking projections 50 may engage the second locking apertures 40 of the respective tracks 24, 26 such that the locking projections 50 are disposed proximate to the second end 68 of each track 24, 26. Engagement between the locking projections 50 and the respective second locking apertures 40 of the first track 24 and the second track 26 positions the locking mechanism 16 in the locked state and maintains the second housing 14 the expanded state.

When the second housing 14 and the first housing 12 are in the expanded state, a top surface 84 of the rim 18 is substantially flush with a top surface 86 of the second housing 14. Once the top surface 84 of the rim 18 is substantially flush with a top surface 86 of the second housing 14, the rim 18 of the first housing 12 and the rim 44 of the second housing 14 may cooperate to provide the fuel-door housing 10 with a substantially circular or oval shape.

In addition to alignment between the rim 18 of the first housing 12 and the rim 44 of the second housing 14, when the first housing 12 and the second housing 14 are positioned in the expanded state, the recess 20 of the first housing 12 may be positioned relative to the recess 46 of the second housing 14 such that the recesses 20, 46 cooperate to provide the fuel-door housing 10 with a substantially circular or oval opening 88. The opening 88 may be aligned with the opening created by the rim 18 of the first housing 12 and the rim 44 of the second housing 14 to allow a fuel-filler nozzle (not shown) of a gas pump (not shown) to be received within the fuel door housing 10 to dispense fuel into a fuel system (not shown) of the vehicle 76 via the opening 88.

Once the first housing 12 and the second housing 14 are moved into the expanded state and the locking mechanism 16 is moved into the locked state, the fuel door housing 10 may be attached to the body panel 74 of the vehicle 76. Specifically, retention features 90 associated with each of the first housing 12 and the second housing 14 may engage an inner surface 92 (FIG. 9) of the body panel 74 to retain the fuel-door housing 10 in a desired position relative to the aperture 78 of the body panel 74.

The actuation mechanism 70 is automatically installed in a desired position relative to the body panel 74 once the fuel-door housing 10 is attached to the body panel 74, as the actuation mechanism 70 is pre-assembled to the mounting aperture 22 of the first housing 12 prior to assembly of the fuel-door housing 10 to the body panel 74. Further, the release cable 72 is likewise pre-assembled to the actuation mechanism 70 and, thus, to the first housing 12 prior to assembly of the fuel-door housing 10 in the body panel 74 and, likewise, may be readily installed once the fuel-door housing 10 is attached to the body panel 74. Finally, once the fuel door housing 10 is fixed to the body panel 74, the arm 54 may pivot about the pivot 58 to allow the door 62 to move between a closed state (FIG. 1) and an open state (FIG. 8) to provide access to the first housing 12 and the second housing 14 to insert a fuel-filler nozzle into the housings 12, 14 and provide fuel to the fuel system of the vehicle 76 via the opening 88 formed by the housings 12, 14.

What is claimed is:
1. A fuel-door housing comprising:
a first housing and a second housing that cooperate to define an outer perimeter of the fuel-door housing, the first and second housings slidably attached to each other and moveable away from each other from an overlapped state to an expanded state with the outer perimeter of the fuel-door housing expanded when the first and second housings have been moved to the expanded state; and
a locking mechanism operable between an unlocked state permitting movement of said second housing into said second state and a locked state restricting relative move- ment between said first housing and said second housing to maintain said second housing in said second state.

2. The fuel-door housing of claim 1, wherein said first housing and said second housing cooperate with one another to form an opening when the first and second housings are in the expanded state wherein said first housing includes a first rim portion and said second housing includes a second rim portion, said first rim portion forming a first portion of said opening, and said second rim portion forming a second portion of said opening.

3. The fuel-door housing of claim 2, wherein said opening includes one of a circular or oval shape.

4. The fuel-door housing of claim 1, wherein said locking mechanism automatically moves from said unlocked state to said locked state when said second housing is moved a predetermined distance relative to said first housing.

5. The fuel-door housing of claim 1, wherein said locking mechanism includes a projection formed in one of said first housing and said second housing and an aperture formed in the other of said first housing and said second housing, said projection being received within said aperture to secure said second housing in said second state.

6. The fuel-door housing of claim 5, wherein said projection is slidably received within a track that controls movement between said first housing and said second housing.

7. The fuel-door housing of claim 1, wherein one of said first housing and said second housing includes a track and the other of said first housing and said second housing includes a projection slidably received within said track, said projection and said track cooperating to guide movement of said second housing relative to said first housing when said second housing is moved from said first state to said second state.

8. The fuel-door assembly of claim 7, wherein said track guides movement of said second housing relative to said first housing when said second housing is moved from said first state to said second state.

9. The fuel-door assembly of claim 1, wherein said second housing is moved into said second state when a force is applied to one of both of said first housing and said second housing that causes at least one of said first housing and said second housing to move away from one another.

10. The fuel-door assembly of claim 1, wherein said first housing and said second housing are moved away from one another to position said second housing in said second state.

11. A fuel-door housing comprising:
a first housing and a second housing that cooperate to define an outer perimeter of the fuel-door housing, the first and second housings-slidably attached to each other and moveable away from each other from an overlapped state to an expanded state with the outer perimeter of the fuel-door housing expanded when the first and second housings have been moved to the expanded state; and
a locking mechanism permitting relative movement between said first housing and said second housing in an unlocked state and restricting relative movement between said first housing and said second housing when at least one of said first housing and said second housing is moved away from the other of said first housing and said second housing a predetermined distance to fix a relative position between said first housing and said second housing in a locked state.

12. The fuel-door housing of claim 11, wherein said second housing overlaps said first housing when said locking mechanism is in said unlocked state.

13. The fuel-door assembly of claim 12, wherein said second housing is positioned adjacent to said first housing and cooperates with said first housing to create an opening when said locking mechanism is in said locked state.

14. The fuel-door assembly of claim 11, wherein said second housing is positioned adjacent to said first housing and cooperates with said first housing to create an opening when said locking mechanism is in said locked state.

15. The fuel-door assembly of claim 11, wherein said locking mechanism is automatically moved into said locked state when said at least one of said first housing and said second housing is moved said predetermined distance.

16. The fuel-door assembly of claim 11, wherein said locking mechanism includes a projection formed in one of said first housing and said second housing and an aperture formed in the other of said first housing and said second housing, said projection being received within said aperture when said locking mechanism is in said locked state.

17. The fuel-door housing of claim 16, wherein said projection is slidably received within a track that controls movement between said first housing and said second housing.

18. The fuel-door housing of claim 11, wherein one of said first housing and said second housing includes a track and the other of said first housing and said second housing includes a projection slidably received within said track.

19. The fuel-door assembly of claim 18, wherein said track guides relative movement between said first housing and said second housing.

20. The fuel-door assembly of claim 11, wherein one of said first housing and said second housing is moved down and away from the other of said first housing and said second housing to permit said locking mechanism to move into said locked state.

* * * * *